United States Patent
Srinivasan

(10) Patent No.: US 10,419,092 B2
(45) Date of Patent: Sep. 17, 2019

(54) CHANNEL IDENTIFICATION USING USER-PLANE BASEBAND DATA COMMUNICATED TO A REMOTE RADIO HEAD

(71) Applicant: CommScope Technologies LLC, Hickory, NC (US)

(72) Inventor: Navin Srinivasan, Fairfax, VA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/777,737

(22) PCT Filed: Dec. 21, 2016

(86) PCT No.: PCT/US2016/068108
§ 371 (c)(1),
(2) Date: May 21, 2018

(87) PCT Pub. No.: WO2017/112807
PCT Pub. Date: Jun. 29, 2017

(65) Prior Publication Data
US 2018/0337718 A1   Nov. 22, 2018

Related U.S. Application Data

(60) Provisional application No. 62/270,362, filed on Dec. 21, 2015.

(51) Int. Cl.
*H04B 7/06*   (2006.01)
*H04L 1/06*   (2006.01)
(Continued)

(52) U.S. Cl.
CPC ............ *H04B 7/0608* (2013.01); *H04B 7/04* (2013.01); *H04L 1/06* (2013.01); *H04L 25/03* (2013.01);
(Continued)

(58) Field of Classification Search
CPC ...... H04B 7/04; H04B 7/0408; H04B 7/0413; H04B 7/0608; H04L 25/03; H04L 25/14; H04L 1/06; H04W 88/085
See application file for complete search history.

(56) References Cited

U.S. PATENT DOCUMENTS

2014/0198684 A1* 7/2014 Gravely ............... H04W 24/02
                                                                370/254
2014/0369311 A1* 12/2014 Bi ....................... H04B 7/0452
                                                                370/330
2015/0271003 A1    9/2015 Kuchi et al.

FOREIGN PATENT DOCUMENTS

EP       2381597 A1   10/2011
WO    2015133952 A1    9/2015

OTHER PUBLICATIONS

ETSI, "LTE; Evolved Universal Terrestrial Radio Access (E-UTRA); Physical Channels and Modulation", "3GPP TS 36.211 Version 12.7.0 Release 12", "Technical Specification", "http://www.etsi.org/standards-search", Dated Oct. 2015, pp. Cover, 1-138, Publisher: ETSI.

(Continued)

*Primary Examiner* — Siu M Lee
(74) *Attorney, Agent, or Firm* — Fogg & Powers LLC

(57) ABSTRACT

A method of associating streams of baseband data with one or more antenna ports of a remote radio head (RRH) is provided. The method includes extracting streams of baseband data from a user-plane of front-haul data communicated to the RRH over a communication link, determining which, if any, layer mapping and precoding scheme and associated antenna port configuration was used to encode and modulate one or more of the extracted streams of baseband data, wherein each layer mapping and precoding scheme has one or more of associated antenna port configurations, each antenna port configuration associating each of (Continued)

one or more steams of baseband data with a respective antenna port of the RRH.

20 Claims, 2 Drawing Sheets

(51) Int. Cl.
    *H04L 25/03*     (2006.01)
    *H04B 7/04*     (2017.01)
    *H04L 25/14*     (2006.01)
    *H04B 7/0413*     (2017.01)
    *H04W 88/08*     (2009.01)

(52) U.S. Cl.
    CPC ............ *H04L 25/14* (2013.01); *H04B 7/0413* (2013.01); *H04W 88/085* (2013.01)

(56) References Cited

OTHER PUBLICATIONS

International Searching Authority, "International Search Report for PCT Application No. PCT/US2016/068108", Foreign counterpart to U.S. Appl. No. 62/270,362, dated Apr. 7, 2017, pp. 1-14, Published in: WO.

\* cited by examiner

CHANNEL IDENTIFICATION USING USER-PLANE BASEBAND DATA COMMUNICATED TO A REMOTE RADIO HEAD

BACKGROUND

The traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data (referred to as basedband IQ data below) output from the BBU to radio frequency signals for radiating from one or more antennas coupled to the RRH and to produce baseband data, e.g., baseband IQ data, for the BBU from radio frequency signals that are received at the RRH via one or more antennas.

The RRH is typically installed near the BTS antennas, often at the top of a tower, and the BBU is typically installed in a more accessible location, often at the bottom of the tower. The BBU and the RRH are typically connected through one or more fiber optic links. The BBU operates on digital baseband data, interfacing to the RRH, which provides the radio frequency (RF) transceiver functionality to convert from baseband to RF and vice versa. The RRH typically has multiple antenna ports for interfacing to multiple base station antennas for diversity and MIMO operation. The interface between the BBU and the RRH is defined by front-haul communication link standards such as the Common Public Radio Interface (CPRI) family of specifications, the Open Base Station Architecture Initiative (OB-SAI) family of specifications, and the Open Radio Interface (ORI) family of specifications. The different front-haul communication link specifications define a control and management (C&M) plane and a user-plane. The C&M plane carries all the control, management, and maintenance data and the user-plane carries the baseband IQ data. When the BBU is configured for LTE MIMO configurations, the baseband IQ data for the different antenna ports is sent on multiple baseband IQ data streams in the user-plane and the C&M plane is used to associate each baseband IQ data stream with the correct antenna port of the RRH.

However, the C&M channel is typically vendor-specific and proprietary. As a result, the association information in the C&M plane that is used by the RRH to associate each baseband IQ data stream with an antenna port is not easily available to other devices or systems that use the baseband IQ data streams and need to know with which antenna port each baseband IQ data stream is associated.

DRAWINGS

DETAILED DESCRIPTION

Figure 1:
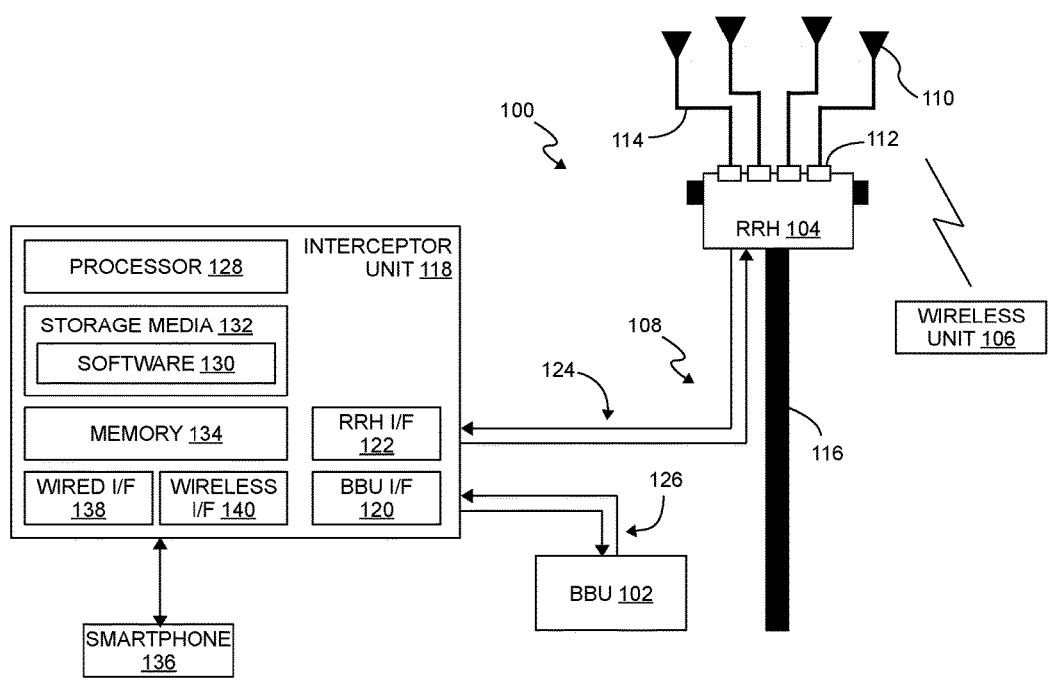
FIG. 1 is a block diagram of one exemplary embodiment of a distributed base station system in which the baseband IQ stream identification techniques described here can be used.

FIG. 1 is a block diagram of one exemplary embodiment of a distributed base station system 100 in which the digital baseband IQ stream identification techniques described below can be used.

In the exemplary embodiment shown in FIG. 1, the system 100 comprises a baseband unit (BBU) 102 and remote radio head (RRH) 104 that communicate over a wireless radio frequency (RF) channel with one or more wireless units 106 (such as mobile telephones, smartphones, tablets, wireless modems for laptops or other computers or for other devices such as wireless sensors or other "Internet of Things" (JOT) or machine-to-machine (M2M) devices) using a standard wireless air interface. The exemplary embodiment shown in FIG. 1 is described here as using a Long-Term Evolution (LTE) 4G air interface described in the "Third Generation Partnership Project (3GPP) Technical Specification (TS) 36.211 Evolved Universal Terrestrial Radio Access (E-UTRA); Physical Channels and Modulation" specification produced by the 3GPP (however, it is to be understood that other air interfaces can be used).

The BBU 102 is communicatively coupled to the core network (not shown) of a wireless service provider using a suitable bi-directional backhaul communication link and interface (for example, using a wireless or wired ETHERNET connection and using the LTE S1 interface). The backhaul communication link can also be used for basestation-to-basestation communications using the LTE X2 interface.

The BBU 102 is communicatively coupled to the RRH 104 using a bi-directional front-haul communication link 108. In the exemplary embodiment shown in FIG. 1, the bi-directional front-haul communication link 108 is implemented using a pair of optical fibers, where one optical fiber is used for downlink communications from the BBU 102 to the RRH 104 and the other optical fiber is used for uplink communications from the RRH 104 to the BBU 102. It is to be understood, however, that the front-haul communication link 108 can be implemented in other ways. The exemplary embodiment shown in FIG. 1 is described here as using a CPRI interface for communications between the BBU 102 and the RRH 104 over the front-haul communication link 108. It is to be understood, however, that a different front-haul interface could be used (for example, the OBSAI or ORI interface).

As noted above, the BBU 102 performs baseband processing for the particular air interface that is being used to wirelessly communicate over the RF channel, and the RRH 104 performs radio frequency processing to convert baseband data output from the BBU 102 to radio frequency signals for radiating from one or more antennas 110 that are connected to the RRH 104 and to produce baseband data for the BBU 102 from radio frequency signals that are received at the RRH 104 via one or more antennas 110. In the exemplary embodiment shown in FIG. 1, each antenna 110 is connected to a respective port 112 of the RRH 104 using a respective coaxial cable 114.

The baseband IQ data is generated as a part of the physical layer processing that is performed for the wireless RF channel in order to communicate frames of user and control information to and from the wireless units 106 in accordance with the air interface. However, with respect to the front-haul communication link 108, this baseband IQ data is the user-plane information (that is, the "payload") communicated over the front-haul communication link 108 along with control and management plane information using the CPRI interface. In the exemplary embodiment described here in connection with FIG. 1, the baseband IQ data is generated in order to communicate frames of user and control information over the wireless RF channel in accordance with the LTE air-interface, and this baseband IQ data is the user-plane information that is communicated over the front-haul interface 108 along with control and management plane information in CPRI frames using the CPRI interface.

During normal operation of the system 100, in the downlink direction, the BBU 102 generates downlink baseband IQ data to encode frames of downlink user and control information received from the core network for communication to the wireless units 106 over the wireless RF channel. The downlink baseband IQ data is communicated from the BBU 102 to the RRH 104 over the front-haul communication link 108. The RRH 104 receives the downlink baseband IQ data and generates one or more downlink analog radio frequency signals that are radiated from the one or more antennas 110 for reception by the wireless units 106. The wireless units 106 perform baseband processing, in accordance with the air interface, on the received downlink analog RF downlink signals in order to recover the frames of downlink user and control information.

During normal operation of the system 100, in the uplink direction, the wireless units 106 generate, in accordance with the air interface, uplink analog radio frequency signals that encode uplink user and control information that is to be communicated to the core network and transmits the generated uplink analog RF signals over the wireless RF channel. The uplink analog RF signals are received by one or more antennas 110 connected to the RRH 104. The RRH 104 produces uplink baseband IQ data from the received uplink analog RF signals. The uplink baseband IQ data is communicated from the RRH 104 to the BBU 102 over the front-haul communication link 108. The BBU 102 receives the uplink baseband IQ data and performs baseband processing, in accordance with the air interface, on the uplink baseband IQ data in order to recover the uplink user and control information transmitted from the wireless units 106. The BBU 102 communicates the recovered uplink user and control information to the core network over the backhaul communication link using the backhaul interface.

The RRH 104 is typically installed remotely from the BBU 102, near the antennas 110 and is mounted to a structure 116 (such as a tower, pole, building, tree, or other structure). For example, the RRH 104 can be mounted near the top of the structure 116 and the BBU 102 can be located on the ground, where the optical fibers used to implement the front-haul communication link 108 run up the structure 116 to couple the BBU 102 to the RRU 104. Although FIG. 1 shows the RRH 104 mounted near the top of structure 116, the RRH 104 can be mounted at other positions relative to the structure 116, for example, approximately midway between the bottom and top of the structure 116.

An interceptor unit 118 can be coupled to the front-haul communication link 108 in order to capture downlink and uplink frames of data communicated between the BBU 102 and the RRH 104 while the BBU 102 and the RRH 104 are operating normally. Also, the interceptor unit 118 can inject test baseband IQ data into the frames of data communicated over the front-haul communication link 108.

In the exemplary embodiment shown in FIG. 1, the interceptor unit 118 is implemented as an optical passive intermodulation (PIM) tester 118. It is to be understood, however, that the interceptor unit 118 can be implemented in other ways. For example, the interceptor unit 118 can be implemented as an optical spectrum analyzer, interference detector, and/or signal quality management system. Moreover, one or more of these functions (for example, PIM testing, spectrum analyzer, interference detecting, and signal quality management) can be combined into a single interceptor unit 118. For example, the optical PIM tester 118 described below can also include one or more of spectrum analyzer, interference detection, and/or signal quality management functions, in addition to PIM testing functions.

Passive Intermodulation (PIM) occurs when two or more high power RF signals encounter PIM sources or materials in an RF path. These PIM sources behave like a mixer causing new signals to be generated at mathematical combinations of the original RF inputs. When these PIM signals fall in the receive frequency band of the system 100, the noise floor rises causing increased dropped calls, reduced data transmission rates, and/or decreased system capacity.

The primary PIM sources in the system 100 shown in FIG. 1 are inconsistent metal to metal contacts in high current density regions such as at the antenna port 112, in the coaxial cable 114, at the connectors connecting the coaxial cable 114 to the antenna 110 or the antenna port 112, or in the antenna 110.

PIM testing involves outputting two high power test RF signals on each antenna port 112. If the two test signals encounter a non-linear junction (for example, at the antenna port 112, in the coaxial cable 114, at the connectors connecting the coaxial cable 114 to the antenna 110 or the antenna port 112, or in the antenna 110) mixing occurs causing the PIM frequencies to be generated. The PIM signals travel in all directions from the point of generation. This means they travel in both the downlink and uplink direction. The PIM signals travelling in the uplink direction can be received and analyzed by the optical PIM tester 118.

However, connecting PIM test equipment directly to the antenna ports 112 of the RRH 104 is typically inconvenient, especially when the RRH 104 is mounted near the top of a tower or other structure 116.

To avoid having to do this, the optical PIM tester 118 is coupled to the front-haul communication link 108 near the BBU 102.

In the exemplary embodiment shown in FIG. 1, the optical PIM tester 118 is coupled to the front-haul communication link 108 by connecting the optical PIM tester 118 in-line with the BBU 102 and the RRH 104. The optical PIM tester 118, in this exemplary embodiment, includes two bi-directional optical interfaces, one of which is a BBU optical interface 120 and the other of which is a RRH optical interface 122. Each optical interface 120 and 122 comprises a pair of optical connectors (for example, a pair LC optical connectors) and an optical transceiver for sending optical signals over one of the optical fibers and for receiving optical signals from the other of the optical fibers. In one implementation, each optical interface 120 and 122 is implemented using a small form-factor pluggable (SFP) modular optical transceiver that includes integrated optical LC connectors.

Each of the optical interfaces 120 and 122 also includes respective physical layer device (PHY). In the exemplary embodiment shown in FIG. 1, where a CPRI interface is established over the front-haul communication link 112, the physical layer devices comprise CPRI physical layer devices.

The pair of optical fibers 124 that is connected to the RRU 104 at one end and that normally would be connected to the BBU 102 at the other end is instead disconnected from the BBU 102 and connected to the RRH optical interface 122 of the optical PIM tester 118. One end of another pair of optical fibers 126 is connected to the BBU 102, where the other end of that second pair of optical fibers 126 is connected to the BBU optical interface 120. It is to be understood, however, that the optical PIM tester 118 can be coupled to the front-haul communication link 108 in other ways (for example, using passive optical couplers).

In the exemplary embodiment shown in FIG. 1, the optical PIM tester 118 further comprises one or more programmable processors 128 for executing software 130. The software 130 comprises program instructions that are stored (or otherwise embodied) on or in an appropriate non-transitory storage medium or media 132 (such as flash or other non-volatile memory, magnetic disc drives, and/or optical disc drives) from which at least a portion of the program instructions are read by the programmable processor 128 for execution thereby. Although the storage media 132 is shown in FIG. 1 as being included in, and local to, the optical PIM tester 118, it is to be understood that remote storage media (for example, storage media that is accessible over a network) and/or removable media can also be used. The optical PIM tester 118 also includes memory 134 for storing the program instructions (and any related data) during execution by the programmable processor 128. Memory 134 comprises, in one implementation, any suitable form of random access memory (RAM) now known or later developed, such as dynamic random access memory (DRAM). In other embodiments, other types of memory are used. Functionality described here as being implemented in software 130 can be implemented in other ways (for example, using an application specific integrated circuit (ASIC) or field programmable gate array (FPGA)).

The software 130 executing on the programmable processor 128 sends and receives frames of user-plane and control plane information with the physical layer devices included in the optical interfaces 120 and 122. For example, the software 130 is configured to capture downlink frames in order to determine system information that the BBU 102 and the RRU 104 are using for communicating with each other and with the wireless units 106 over the wireless RF channel (for example, information identifying what RF frequency channels are being used to communicate over the RF frequency channel).

In this exemplary embodiment, the optical PIM tester 118 can be operated in a PIM test mode. In this mode, downlink CPRI frames are transmitted by the BBU 102 on the front-haul communication link 108 (more specifically, on the downlink fiber included in the fiber pair 126). The optical signals are received at the BBU optical interface 120, which converts the received optical signal to an electrical signal that is provided to the CPRI PHY included in the BBU optical interface 120. The CPRI PHY extracts the downlink CPRI frames from the received signals and communicates the downlink CPRI frames to the programmable processor 128 for processing by the software 130. The software 130 is configured to insert digital baseband IQ data for the PIM test signals into a desired antenna container (AxC) included in the downlink CPRI frames. That is, the baseband IQ data that the BBU 102 originally included in that AxC is replaced with the baseband IQ data for the PIM test signals. The software 130 forwards the modified downlink CPRI frames to the CPRI PHY in the RRH optical interface 122 for transmitting the modified downlink CPRI frames to the RRU 104 the downlink fiber included in the pair of optical fibers 124. The RRU 104 extracts the digital baseband IQ data for that AxC and then generates an analog RF signal that comprises the PIM test signals and outputs the PIM test signals on the relevant antenna port 112.

Any PIM signals generated due to PIM sources (for example, at the antenna port 112, in the coaxial cable 114, at the connector connecting the coaxial cable 114 to the antenna 114 or the antenna port 112, or in the antenna 110) will show up in the uplink signals received on the antenna ports 112 of the RRH 104 and will be reflected in the uplink digital baseband IQ data transmitted by the RRH 104 in uplink CPRI frames to the BBU 102 via the front-haul communication link 108.

The uplink CPRI frames transmitted from the RRH 104 on the front-haul communication link 108 are captured by the optical PIM tester 118 and checked for PIM. That is, uplink CPRI frames transmitted by the RRH 104 on the front-haul communication link 108 (more specifically, on the uplink fiber included in the fiber pair 124). The optical signals are received at the RRH optical interface 122, which converts the received optical signal to an electrical signal that is provided to the CPRI PHY included in the RRH optical interface 122. The CPRI PHY extracts the uplink CPRI frames from the received signals and communicates the uplink CPRI frames to the programmable processor 128 for processing by the software 130. The software 130 is configured to extract the uplink baseband IQ data from the AxCs included in the uplink CPRI frames and process that baseband IQ data in order to identify and characterize any PIM that may occur in the uplink in response to injecting the PIM test signals.

A user can interact with the software 130 executing on the optical PIM tester 118 using a smartphone, tablet, or computer 136 that is communicatively coupled to the optical PIM tester 118. In the exemplary embodiment shown in FIG. 1, the optical PIM tester 118 includes one or more wired interfaces 138 (for example, an ETHERNET interface and/or a USB interface) and wireless interfaces 140 (for example, a Wi-Fi wireless interface) to communicatively couple the optical PIM tester 118 to a local area network or directly to the smartphone, tablet, or computer 136. Moreover, a remotely located smartphone, tablet, or computer 136 can access the optical PIM tester 118 via a connection established over the local area network and/or a public network such as the Internet. In one embodiment, the software 130 implements a webserver that is operable to present a browser-based user interface that enables a user to use a general-purpose Internet browser installed on the smartphone, tablet, or computer 136 to interact with the software 130 on the optical PIM tester 118.

In the exemplary embodiment shown in FIG. 1, the RRH 104 can be used with one or more antennas 110 (for example, using multiple-input-multiple-output (MIMO) techniques that use multiple transmit and receive antennas 110 and non-MIMO configurations that use a single transmit and receive antenna 110). Downlink and uplink baseband IQ data for each antenna port 112 is communicated within the downlink and uplink CPRI frames in a separate logical stream referred to as an "antenna carrier" or "AxC". The information used to associate each AxC with the appropriate antenna port 112 is communicated in the control and management plane of the CPRI frames. However, as noted above, the control and management plane is typically vendor-specific and proprietary. As a result, the software 130 executing on the optical PIM tester 118 typically will not be able to extract such association information from the control and management plane of the CPRI frames in order to determine which antenna port 112 is associated with each antenna carrier.

In order to address this issue, the optical PIM tester 118 is configured to associate an antenna port 112 in the RRH 104 with each antenna carrier using the baseband IQ data contained in the antenna carrier. In this way, the association information communicated in the control and management plane of the CPRI frames need not be used.

As noted above, in this exemplary embodiment, the CPRI interface is implemented on the front-haul communication link 108 between the BBU 102 and the RRH 104 and the LTE air interface is used for communicating over the wireless RF channel with wireless units 106.

The techniques described here for associating baseband IQ data (and the corresponding antenna carriers) with the antenna ports 112 of the RRH 104 are used with the LTE Downlink Broadcast Channel (BCH). For the BCH, the possible number of transit antenna ports 112 that can be used are one, two, or four.

Where the BBU 102 is configured to transmit the LTE BCH on one antenna port 112, the CPRI frames would includes one AxC carrying baseband IQ data for the single antenna port 112. Where the BBU 102 is configured to transmit the LTE BCH on two antenna ports 112, the CPRI frames would include two AxCs carrying baseband IQ data for the two antenna ports 112. Where the BBU 102 is configured to transmit the LTE BCH on four antenna ports 112, the CPRI frames would include four AxCs carrying baseband IQ data for the four antenna ports 112, where, as described below in connection with Table 1, even modulation symbols are mapped to even-numbered antenna ports (antenna ports 0 and 2) and odd modulation symbols are mapped to odd-numbered antenna ports (antenna ports 1 and 3).

The LTE air interface defines, for each number of antenna ports 112 that can be used for the BCH, a specific layer mapping and precoding combination that is used for each antenna port 112.

Where transmission of the BCH is done on two or four antenna ports 112, the LTE air interface indicates that layer mapping is done as shown in Table 6.3.3.3-1 from the 3GPP TS 36.211 Evolved Universal Terrestrial Radio Access (E-UTRA); Physical Channels and Modulation specification, which is reproduced below as Table 1. There is only one codeword and the number of layers v is equal to the number of antenna ports P used for transmission of the physical channel.

TABLE 1

| Number of layer | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$<br>If $M_{symb}^{(0)} \bmod 4 \neq 0$ two null symbols shall be appended to $d^{(0)}(M_{symb}^{(0)} - 1)$ |

In Table 1, the letter d denotes the input modulation symbol (codeword) and x denotes the modulation symbol mapped onto the subcarrier of a layer. Thus, even numbered modulation symbols are mapped to even layers, and odd symbols are mapped to odd layers.

Where transmission of the BCH is done on one antenna port 112, the LTE air interface indicates in Section 6.3.3.1 of the 3GPP TS 36.211 Evolved Universal Terrestrial Radio Access (E-UTRA); Physical Channels and Modulation specification that layer mapping is done as follows:

$$x^{(0)}(i) = d^{(0)}(i)$$

with $M_{symb}^{layer} = M_{symb}^{(0)}$.

Where transmission of the BCH is done on two antenna ports 112, $p \in \{0,1\}$, the LTE air interface indicates that the output $y(i)=[y^{(0)}(i)\ y^{(1)}(i)]$, $i=0,1,\ldots,M_{symb}^{AP}-1$, of the precoding operation is defined by the following matrix:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix}$$

This matrix is set out in Section 6.3.4.3 of the 3GPP TS 36.211 Evolved Universal Terrestrial Radio Access (E-UTRA); Physical Channels and Modulation specification.

From the above matrix, the data transmitted on "antenna port 0" is given by the following:

$$y^{(0)}(2i) = \frac{1}{\sqrt{2}} d^{(0)}(2i)$$

$$y^{(0)}(2i+1) = \frac{1}{\sqrt{2}} d^{(0)}(2i+1)$$

for $i=0, 1, \ldots, M_{symb}^{AP}-1$, with $M_{symb}^{AP}=2M_{symb}^{layer}$.

From the above matrix, the data transmitted on "antenna port 1" is given by the following:

$$y^{(1)}(2i) = \frac{-1}{\sqrt{2}} \text{conjugate}(d^{(0)}(2i+1))$$

-continued $$y^{(1)}(2i+1) = \frac{1}{\sqrt{2}} \text{conjugate}(d^{(0)}(2i))$$

for $i=0, 1, \ldots, M_{symb}^{AP}-1$, with $M_{symb}^{AP}=2M_{symb}^{layer}$.

Where transmission of the BCH is done on four antenna ports 112, $p \in \{0,1,2,3\}$, the LTE air interface indicates that the output $y(i)=[y^{(0)}(i)\ y^{(1)}(i)\ y^{(2)}(i)\ y^{(3)}(i)]$, $i=0, 1, \ldots, M_{symb}^{AP}-1$, of the precoding operation is defined by the following matrix:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

This matrix is set out in Section 6.3.4.3 of the 3GPP TS 36.211 Evolved Universal Terrestrial Radio Access (E-UTRA); Physical Channels and Modulation specification.

From the above matrix, the data transmitted on "antenna port 0" is given by the following:

$$y^{(0)}(4i) = \frac{1}{\sqrt{2}} d^{(0)}(4i)$$

$$y^{(0)}(4i+1) = \frac{1}{\sqrt{2}} d^{(0)}(4i+1)$$

$$y^{(0)}(4i+2) = 0$$

$$y^{(0)}(4i+3) = 0$$

for $i = 0, 1, \ldots, M_{symb}^{layer} - 1$ with $$M_{symb}^{AP} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0 \end{cases}.$$

From the above matrix, the data transmitted on "antenna port 1" is given by the following:

$$y^{(1)}(4i) = 0$$

$$y^{(1)}(4i+1) = 0$$

$$y^{(1)}(4i+2) = \frac{1}{\sqrt{2}} d^{(0)}(4i+2)$$

$$y^{(1)}(4i+3) = \frac{1}{\sqrt{2}} d^{(0)}(4i+3)$$

for $i = 0, 1, \ldots, M_{symb}^{layer} - 1$ with $$M_{symb}^{AP} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0 \end{cases}.$$

From the above matrix, the data transmitted on "antenna port 2" is given by the following:

$$y^{(2)}(4i) = \frac{-1}{\sqrt{2}} \mathrm{conjugate}(d^{(0)}(4i+1))$$

$$y^{(2)}(4i+1) = \frac{1}{\sqrt{2}} \mathrm{conjugate}(d^{(0)}(4i))$$

$$y^{(2)}(4i+2) = 0$$

$$y^{(2)}(4i+3) = 0$$

for $i = 0, 1, \ldots, M_{symb}^{layer} - 1$ with $$M_{symb}^{AP} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0 \end{cases}.$$

From the above matrix, the data transmitted on "antenna port 3" is given by the following:

$$y^{(3)}(4i) = 0$$

$$y^{(3)}(4i+1) = 0$$

$$y^{(3)}(4i+2) = \frac{-1}{\sqrt{2}} \mathrm{conjugate}(d^{(0)}(4i+3))$$

$$y^{(3)}(4i+3) = \frac{1}{\sqrt{2}} \mathrm{conjugate}(d^{(0)}(4i+2))$$

for $i = 0, 1, \ldots, M_{symb}^{layer} - 1$ with $$M_{symb}^{AP} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0 \end{cases}.$$

The LTE air interface standard defines a separate layer mapping and precoding scheme that is used when one, two, or four transmit antennas are used to broadcast the BCH.

As used herein, an "antenna port configuration" for a particular layer mapping and precoding scheme refers to the association of each antenna port that is in use for that scheme to a particular antenna carrier in the downlink CPRI frames. For example, for the layer mapping and precoding scheme that is used when one antenna port is used, each antenna port configuration associated with that scheme associates that single antenna port with one of the antenna carriers in the downlink CPRI frames. For the layer mapping and precoding scheme that is used when two antenna ports are used, each antenna port configuration for that scheme associates each of the two antenna ports with a respective one of the antenna carriers in the downlink CPRI frames. Likewise, for the layer mapping and precoding scheme that is used when four antenna ports are used, each antenna port configuration for that scheme associates each of the four antenna ports with a respective one of the antenna carriers in the downlink CPRI frames.

The software 130 in the optical PIM tester 118 is configured to determine which antenna ports 112 are associated with which antenna containers of a downlink CPRI frame that is used to broadcast the BCH. For each layer mapping and precoding scheme, the software 130 uses the inverse of that layer mapping and precoding scheme to try to demodulate and decode the baseband IQ data for each possible antenna port configuration associated with that scheme. If a layer mapping and precoding scheme successfully demodulates and decodes the baseband IQ data for a given antenna port configuration associated with that scheme, then the antenna carriers are considered to be configured as indicated in that antenna port configuration.

Figure 2:
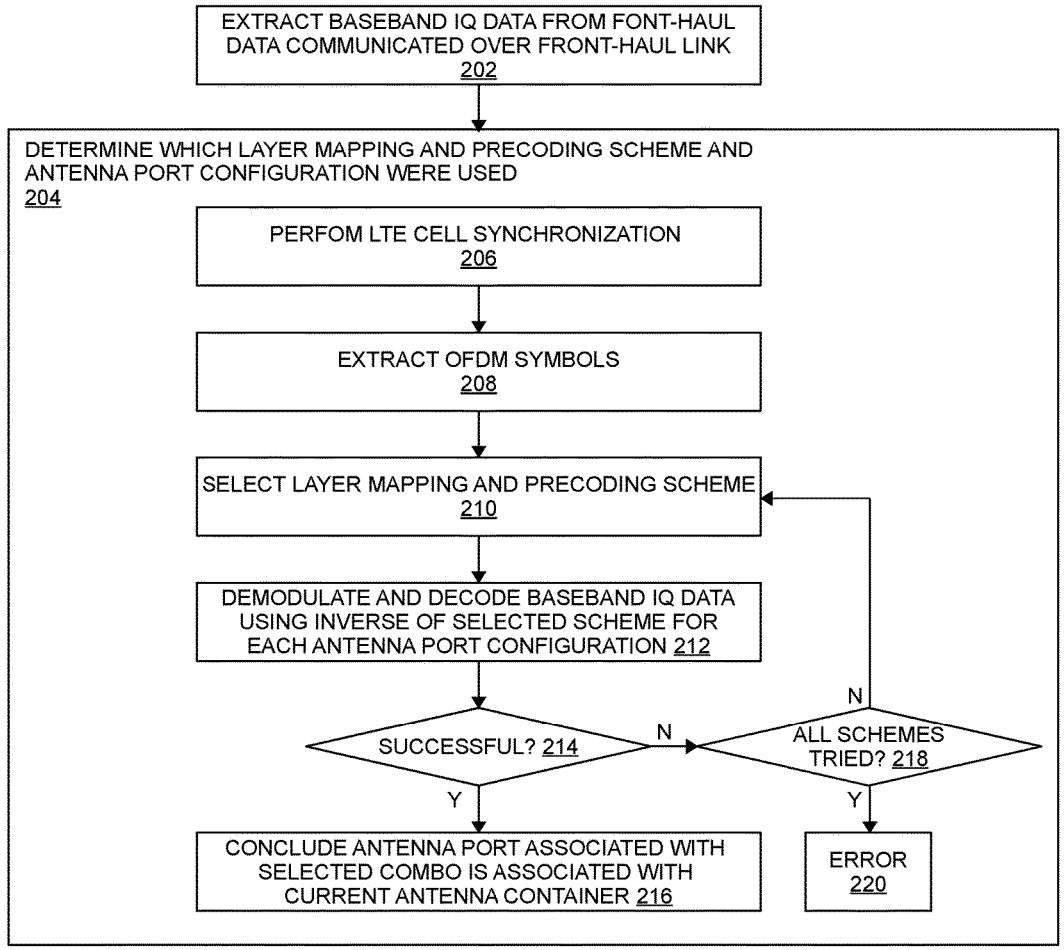
FIG. 2 is a flow diagram of one exemplary embodiment of a method of associating one or more streams of baseband IQ data with one or more antenna ports of a remote radio head.

FIG. 2 is a flow diagram of one exemplary embodiment of a method of associating one or more streams of baseband IQ data with one or more antenna ports of a remote radio head. The exemplary embodiment shown in FIG. 2 is described here as being implemented in the system 100 shown in FIG. 1 in order to associate baseband IQ data used to broadcast the LTE BCH with an antenna port 112 of the RRH 104, though it is to be understood that other embodiments can be implemented in other ways.

More specifically, the processing associated with method 200, in this exemplary embodiment, is implemented by the software 130 executing on the programmable processor 128 in the optical PIM tester 118.

Method 200 comprises extracting the baseband IQ data from the front-haul data communicated over the front-haul communication link 108 (block 202). In this exemplary embodiment, the software 130 executing on the optical PIM tester 118 parses each downlink CPRI frame communicated from the BBU 102 to the RRH 104 over the front-haul communication link 108. The format of the CPRI frames is defined by the CPRI specification. The software 130 extracts the four antenna containers that are included in each downlink CPRI frame that is communicated from the BBU 102 to the RRH 104. The software 130 extracts the baseband IQ data from the antenna containers.

Method 200 further comprises determining which layer mapping and precoding scheme and antenna port configuration were used to encode the BCH for the extracted baseband IQ data (block 204). In general, this is done by using the inverse of each layer mapping and precoding scheme to try to demodulate and decode the baseband IQ data for each antenna port configuration associated with that scheme. If a layer mapping and precoding scheme successfully demodulates and decodes the baseband IQ data for a given antenna port configuration associated with that scheme, then the antenna carriers are considered to be configured as indicated in that antenna port configuration.

In the exemplary embodiment shown in FIG. 2, the determination as to which layer mapping and precoding scheme and antenna port configuration were used to encode and modulate the BCH for the extracted baseband IQ data is done as follows.

LTE cell synchronization is performed on the baseband IQ data for each antenna container (block 206) and the OFDM symbols for the LTE BCH are extracted (block 208). In this exemplary embodiment, the software 130 is configured to perform LTE cell synchronization for each antenna container in order to acquire the physical cell identifier (PCI) and time slot and frame synchronization from the extracted baseband IQ data for each antenna container. Also the software 130 is configured to extract the OFDM symbols for the LTE BCH.

A layer mapping and precoding scheme is selected (block 210). In one implementation, the software 130 is configured to select the layer mapping and precoding scheme in the following order: the single-antenna layer mapping and precoding scheme is tried first, followed by the two-antenna layer mapping and precoding scheme, and finally the four-antenna layer mapping and precoding scheme is tried. However, it is to be understood that this selection order is merely an example and that the layer mapping and precoding schemes can be selected in a different order.

The extracted BCH OFDM symbols are demodulated and decoded using the inverse of the selected layer mapping and precoding scheme for each possible antenna port configuration associated with that scheme (block 212). Then, the software 130 checks if the demodulation and decoding of the extracted BCH OFDM symbols was successful for any of the possible antenna port configurations associated with that scheme (block 214).

In one implementation, this checking is done by checking if the cyclic redundancy check (CRC) codes included in the resulting transport blocks are valid for the demodulated and decoded codewords.

In a second implementation, for the two-antenna layer mapping and precoding scheme, the demodulation and decoding of the extracted BCH OFDM symbols is considered successful for a given antenna port configuration associated with that scheme if the demodulated BCH data for antenna port 0 and antenna port 1 match. Also, in that second implementation, for the four-antenna layer mapping and precoding scheme, the demodulation and decoding of the extracted BCH OFDM symbols is considered successful for a given antenna port configuration associated with that scheme if the demodulated BCH data for antenna port 0 and antenna port 2 match and the demodulated BCH data for antenna port 1 and antenna port 3 match.

If the demodulation and decoding of the extracted BCH OFDM symbols was successful for a particular antenna port configuration associated with the selected layer mapping and precoding scheme, then the antenna carriers in the downlink CPRI frames are considered to be configured as indicated in that antenna port configuration (block 216). If the demodulation and decoding of the extracted BCH OFDM symbols was not successful for any of the antenna port configuration associated with the selected layer mapping and precoding scheme, the next layer mapping and precoding scheme is selected (returning to block 210) and the extracted BCH OFDM symbols are demodulated and decoded using the inverse of the selected layer mapping and precoding scheme for each possible antenna port configuration associated with that scheme (block 212) and a check is made as to whether the demodulation and decoding of the extracted BCH OFDM symbols was successful for any of the possible antenna port configurations associated with that scheme (block 214).

This process is repeated until there is a successful demodulation and decoding of the extracted BCH OFDM symbols for a given antenna port configuration or until all of the layer mapping and precoding schemes have been tried without successfully demodulating and decoding the OFDM symbols (checked at block 218). An error condition exists if all of the layer mapping and precoding schemes are tried without successfully demodulating and decoding the extracted BCH OFDM symbols (block 220).

Embodiments of method 200 enable the baseband IQ data and associated antenna containers communicated over the front-haul communication link from a BBU to a RRH to be associated with the antenna ports 112 using the baseband IQ data itself and without having to access the association data communicated in the control and management plane.

Although the interception unit 118 is described above as being implemented as and in an optical PIM tester, the baseband IQ data association techniques described above can be used with other similar systems and devices that intercept baseband IQ data that is communicated over a front haul communication link between a BBU and RRU including, for example, optical spectrum analyzers, interference detectors and/or signal quality management systems. Moreover, one or more of these functions (for example, PIM testing, spectrum analyzer, interference detecting, and signal quality management) can be combined into a single unit.

Also, although the embodiments described above are described as using antenna carriers in downlink CPRI frames, it is to be understood that the techniques described here can be used with other streams of baseband IQ data (for example, streams of baseband IQ data communicated over an OBSAI or ORI interface).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a method of associating streams of baseband data with one or more antenna ports of a remote radio head (RRH) comprising: extracting streams of baseband data from a user-plane of front-haul data communicated to the RRH over a communication link; determining which, if any, layer mapping and precoding scheme and associated antenna port configuration was used to encode and modulate one or more of the extracted streams of baseband data, wherein each layer mapping and precoding scheme has one or more of associated antenna port configurations, each antenna port configuration associating each of one or more steams of baseband data with a respective antenna port of the RRH; and if it is determined that a layer mapping and precoding scheme and associated antenna port configuration was used to encode and modulate one or more extracted streams of baseband data, concluding that each of said one or more extracted streams of baseband data is associated with a respective antenna port of the RRH as indicated in that antenna port configuration.

Example 2 includes the method of Example 1, wherein the streams of baseband data are communicated in antenna carriers of CPRI frames.

Example 3 includes the method of any of Examples 1-2, wherein the baseband data comprises baseband IQ data.

Example 4 includes the method of Example 3, wherein the baseband IQ data is transmitted using one of a CPRI interface, an OBSAI interface, and a ORI interface.

Example 5 includes the method of any of Examples 1-4, wherein the method is performed in connection with at least one of a PIM testing function, a spectrum analyzer function, an interference detecting function, and a signal quality management function.

Example 6 includes a method of associating streams of baseband data with one or more antenna ports of a remote radio head (RRH) comprising: extracting streams of baseband data from a user-plane of front-haul data communicated to the RRH over a communication link; selecting a layer mapping and precoding scheme; demodulating and decoding one or more streams of baseband data using the inverse of the selected layer mapping and precoding scheme for each associated antenna port configuration; and checking if one or more streams of baseband data were successfully demodulated and decoded using the inverse of the selected layer mapping and precoding scheme for any associated antenna configuration; wherein the selecting, demodulating and decoding, and checking are repeated until one or more streams of baseband data is successfully demodulated and decoded using the inverse of the selected layer mapping and precoding scheme for an antenna port configuration or all of the layer mapping and precoding schemes have been tried without having successfully demodulated and decoded one or more streams of baseband data; wherein if one or more streams of baseband data was successfully demodulated and decoded using the inverse of the selected layer mapping and precoding scheme for a given antenna port configuration, concluding that each of said one or more extracted streams of baseband data is associated with a respective antenna port of the RRH as indicated in that antenna port configuration.

Example 7 includes the method of Example 6, further comprising: performing cell synchronization on the streams of baseband data.

Example 8 includes the method of any of Examples 6-7, further comprising: extracting symbols from the baseband data; and wherein demodulating and decoding one or more streams of baseband data using the inverse of the selected layer mapping and precoding scheme for each associated antenna port configuration comprises: demodulating and decoding the symbols using the inverse of the selected layer mapping and precoding scheme for each associated antenna port configuration.

Example 9 includes the method of Example 8, wherein the symbols comprise OFDM symbols.

Example 10 includes the method of any of Examples 6-9, wherein checking if one or more streams of baseband data were successfully demodulated and decoded using the inverse of the selected layer mapping and precoding scheme for any associated antenna configuration comprises checking if CRC codes included in resulting demodulated and decoded data are valid.

Example 11 includes the method of any of Examples 6-10, wherein checking if one or more streams of baseband data were successfully demodulated and decoded using the inverse of the selected layer mapping and precoding scheme for any associated antenna configuration comprises checking for matching data included in the resulting demodulated and decoded data for two different antenna ports.

Example 12 includes the method of any of Examples 6-11, wherein the baseband data comprises baseband IQ data.

Example 13 includes the method of Example 12, wherein the baseband IQ data is transmitted using one of a CPRI interface, an OBSAI interface, and a ORI interface.

Example 14 includes the method of any of Examples 6-13, wherein the method is performed in connection with at least one of a PIM testing function, a spectrum analyzer function, an interference detecting function, and a signal quality management function.

Example 15 includes an interceptor unit comprising: at least one interface to communicatively couple the interceptor unit to a front-haul communication link used for communicating front-haul data to a remote radio head (RRH) having one or more antenna ports; a programmable processor, coupled to the interface, configured to execute software, wherein the software is operable to cause the interceptor unit to do the following: extract streams of baseband data from a user-plane of front-haul data communicated to the RRH over a communication link; determine which, if any, layer mapping and precoding scheme and associated antenna port configuration was used to encode and modulate one or more of the extracted streams of baseband data, wherein each layer mapping and precoding scheme has one or more of associated antenna port configurations, each antenna port configuration associating each of one or more steams of baseband data with a respective antenna port of the RRH; and if it is determined that a layer mapping and precoding scheme and associated antenna port configuration was used to encode and modulate one or more extracted streams of baseband data, conclude that each of said one or more extracted streams of baseband data is associated with a respective antenna port of the RRH as indicated in that antenna port configuration.

Example 16 includes the interceptor unit of Example 15, wherein the interceptor unit is configured to perform at least one of a PIM testing function, a spectrum analyzer function, an interference detecting function, and a signal quality management function.

Example 17 includes the interceptor unit of any of Examples 15-16, wherein the at least one interface comprises an optical interface with a physical layer device.

Example 18 includes the interceptor unit of Example 17, wherein the physical layer device comprises a CPRI physical layer device.

Example 19 includes an interceptor unit comprising: at least one interface to communicatively couple the interceptor unit to a front-haul communication link used for communicating front-haul data to a remote radio head (RRH) having one or more antenna ports; a programmable processor, coupled to the interface, configured to execute software, wherein the software is operable to cause the interceptor unit to do the following: extract streams of baseband data from a user-plane of front-haul data communicated to the RRH over a communication link; select a layer mapping and precoding scheme; demodulate and decode one or more streams of baseband data using the inverse of the selected layer mapping and precoding scheme for each associated antenna port configuration; and check if one or more streams of baseband data were successfully demodulated and decoded using the inverse of the selected layer mapping and precoding scheme for any associated antenna configuration; wherein the selecting, demodulating and decoding, and checking are repeated until one or more streams of baseband data is successfully demodulated and decoded using the inverse of the selected layer mapping and precoding scheme for an antenna port configuration or all of the layer mapping and precoding schemes have been tried without having successfully demodulated and decoded one or more streams of baseband data; and wherein if one or more streams of baseband data was successfully demodulated and decoded using the inverse of the selected layer mapping and precoding scheme for a given antenna port configuration, concluding that each of said one or more extracted streams of baseband data is associated with a respective antenna port of the RRH as indicated in that antenna port configuration.

Example 20 includes the interceptor unit of Example 19, wherein the interceptor unit is configured to perform at least one of a PIM testing function, a spectrum analyzer function, an interference detecting function, and a signal quality management function.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of associating streams of baseband data with one or more antenna ports of a remote radio head (RRH) comprising:
  extracting streams of baseband data from a user-plane of front-haul data communicated to the RRH over a communication link;
  determining which, if any, layer mapping and precoding scheme and associated antenna port configuration was used to encode and modulate one or more of the extracted streams of baseband data, wherein each layer mapping and precoding scheme has one or more of associated antenna port configurations, each antenna port configuration associating each of one or more streams of baseband data with a respective antenna port of the RRH; and
  if it is determined that a layer mapping and precoding scheme and associated antenna port configuration was used to encode and modulate one or more extracted streams of baseband data, concluding that each of said one or more extracted streams of baseband data is associated with a respective antenna port of the RRH as indicated in that antenna port configuration.

2. The method of claim 1, wherein the streams of baseband data are communicated in antenna carriers of Common Public Radio Interface (CPRI) frames.

3. The method of claim 1, wherein the baseband data comprises baseband IQ data.

4. The method of claim 3, wherein the baseband IQ data is transmitted using one of a CPRI interface, an Open Base Station Architecture Initiative (OBSAI) interface, and an Open Radio Equipment Interface (ORI) interface.

5. The method of claim 1, wherein the method is performed in connection with at least one of a Passive Intermodulation (PIM) testing function, a spectrum analyzer function, an interference detecting function, and a signal quality management function.

6. A method of associating streams of baseband data with one or more antenna ports of a remote radio head (RRH) comprising:
  extracting streams of baseband data from a user-plane of front-haul data communicated to the RRH over a communication link;
  selecting a layer mapping and precoding scheme;
  demodulating and decoding one or more streams of baseband data using the inverse of the selected layer mapping and precoding scheme for each associated antenna port configuration; and
  checking if one or more streams of baseband data were successfully demodulated and decoded using the inverse of the selected layer mapping and precoding scheme for any associated antenna configuration;
  wherein the selecting, demodulating and decoding, and checking are repeated until one or more streams of baseband data is successfully demodulated and decoded using the inverse of the selected layer mapping and precoding scheme for an antenna port configuration or all of the layer mapping and precoding schemes have been tried without having successfully demodulated and decoded one or more streams of baseband data;
wherein if one or more streams of baseband data was successfully demodulated and decoded using the inverse of the selected layer mapping and precoding scheme for a given antenna port configuration, concluding that each of said one or more extracted streams of baseband data is associated with a respective antenna port of the RRH as indicated in that antenna port configuration.

7. The method of claim 6, further comprising:
performing cell synchronization on the streams of baseband data.

8. The method of claim 6, further comprising: extracting symbols from the baseband data; and
wherein demodulating and decoding one or more streams of baseband data using the inverse of the selected layer mapping and precoding scheme for each associated antenna port configuration comprises:
demodulating and decoding the symbols using the inverse of the selected layer mapping and precoding scheme for each associated antenna port configuration.

9. The method of claim 8, wherein the symbols comprise Orthogonal Frequency Division Multiplexing (OFDM) modulated symbols.

10. The method of claim 6, wherein checking if one or more streams of baseband data were successfully demodulated and decoded using the inverse of the selected layer mapping and precoding scheme for any associated antenna configuration comprises checking if Cyclic Redundancy Check (CRC) codes included in resulting demodulated and decoded data are valid.

11. The method of claim 6, wherein checking if one or more streams of baseband data were successfully demodulated and decoded using the inverse of the selected layer mapping and precoding scheme for any associated antenna configuration comprises checking for matching data included in the resulting demodulated and decoded data for two different antenna ports.

12. The method of claim 6, wherein the baseband data comprises baseband IQ data.

13. The method of claim 12, wherein the baseband IQ data is transmitted using one of a Common Public Radio Interface (CPRI) interface, an Open Base Station Architecture Initiative (OBSAI) interface, and an Open Radio Equipment Interface (ORI) interface.

14. The method of claim 6, wherein the method is performed in connection with at least one of a Passive Intermodulation (PIM) testing function, a spectrum analyzer function, an interference detecting function, and a signal quality management function.

15. An interceptor unit comprising:
at least one interface to communicatively couple the interceptor unit to a front-haul communication link used for communicating front-haul data to a remote radio head (RRH) having one or more antenna ports;
a programmable processor, coupled to the interface, configured to execute software, wherein the software is operable to cause the interceptor unit to do the following:
extract streams of baseband data from a user-plane of front-haul data communicated to the RRH over a communication link;
determine which, if any, layer mapping and precoding scheme and associated antenna port configuration was used to encode and modulate one or more of the extracted streams of baseband data, wherein each layer mapping and precoding scheme has one or more of associated antenna port configurations, each antenna port configuration associating each of one or more streams of baseband data with a respective antenna port of the RRH; and
if it is determined that a layer mapping and precoding scheme and associated antenna port configuration was used to encode and modulate one or more extracted streams of baseband data, conclude that each of said one or more extracted streams of baseband data is associated with a respective antenna port of the RRH as indicated in that antenna port configuration.

16. The interceptor unit of claim 15, wherein the interceptor unit is configured to perform at least one of a Passive Intermodulation (PIM) testing function, a spectrum analyzer function, an interference detecting function, and a signal quality management function.

17. The interceptor unit of claim 15, wherein the at least one interface comprises an optical interface with a physical layer device.

18. The interceptor unit of claim 17, wherein the physical layer device comprises a Common Public Radio Interface (CPRI) physical layer device.

19. An interceptor unit comprising:
at least one interface to communicatively couple the interceptor unit to a front-haul communication link used for communicating front-haul data to a remote radio head (RRH) having one or more antenna ports;
a programmable processor, coupled to the interface, configured to execute software, wherein the software is operable to cause the interceptor unit to do the following:
extract streams of baseband data from a user-plane of front-haul data communicated to the RRH over a communication link;
select a layer mapping and precoding scheme;
demodulate and decode one or more streams of baseband data using the inverse of the selected layer mapping and precoding scheme for each associated antenna port configuration; and
check if one or more streams of baseband data were successfully demodulated and decoded using the inverse of the selected layer mapping and precoding scheme for any associated antenna configuration;
wherein the selecting, demodulating and decoding, and checking are repeated until one or more streams of baseband data is successfully demodulated and decoded using the inverse of the selected layer mapping and precoding scheme for an antenna port configuration or all of the layer mapping and precoding schemes have been tried without having successfully demodulated and decoded one or more streams of baseband data; and
wherein if one or more streams of baseband data was successfully demodulated and decoded using the inverse of the selected layer mapping and precoding scheme for a given antenna port configuration, concluding that each of said one or more extracted streams of baseband data is associated with a respective antenna port of the RRH as indicated in that antenna port configuration.

20. The interceptor unit of claim 19, wherein the interceptor unit is configured to perform at least one of a Passive Intermodulation (PIM) testing function, a spectrum analyzer function, an interference detecting function, and a signal quality management function.

* * * * *